March 25, 1969         G. LEURENT         3,434,748

DEVICE FOR ASSEMBLY OF METALLIC SECTIONAL STRUCTURES

Filed Oct. 11, 1966         Sheet 1 of 6

INVENTOR.
G. Leurent
BY Richards & Geier
ATTORNEYS

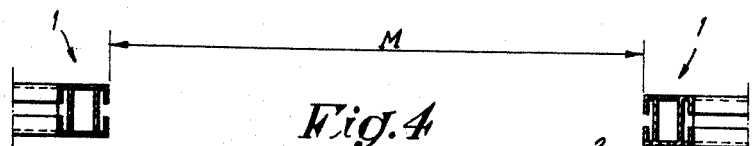
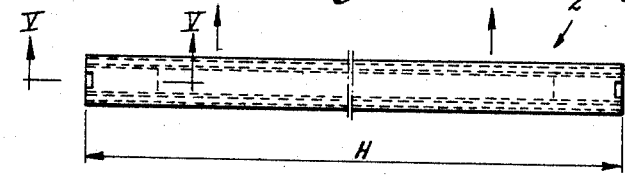
Fig.4
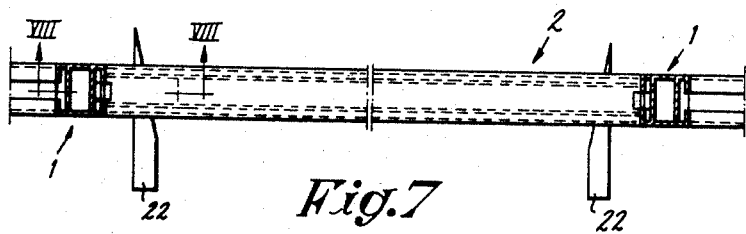
Fig.7
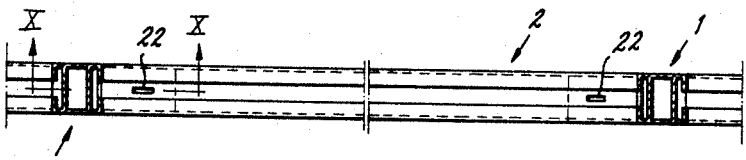
Fig.9
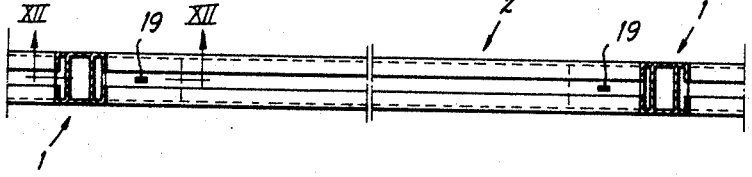
Fig.11

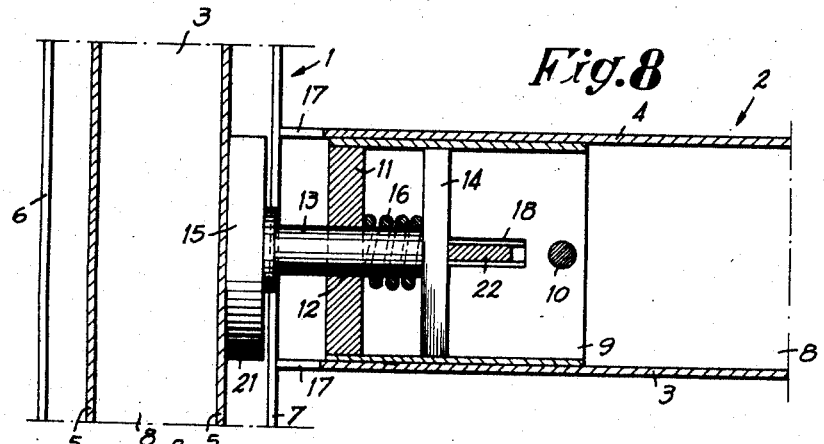
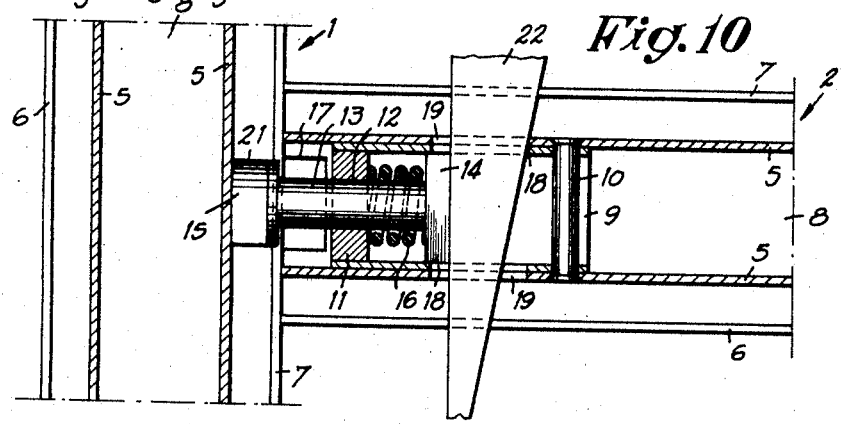
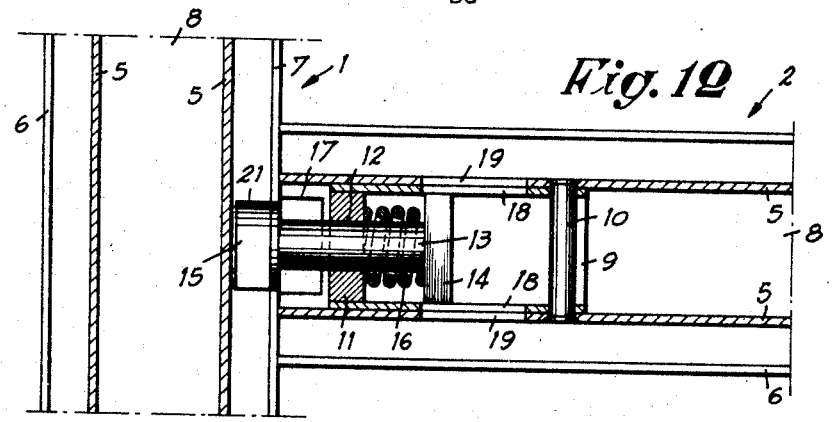

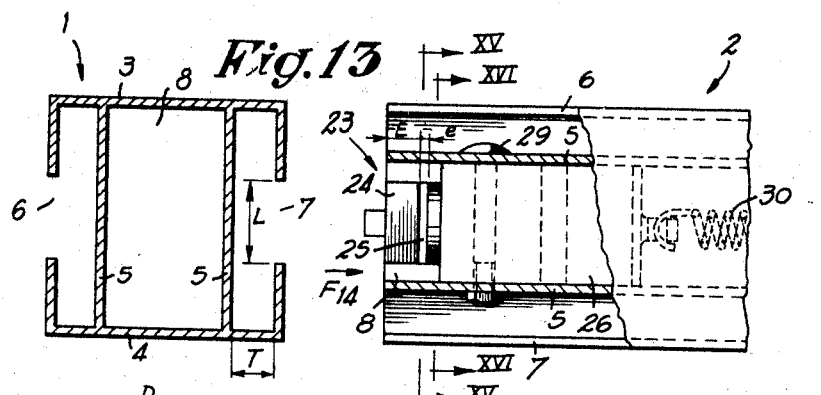
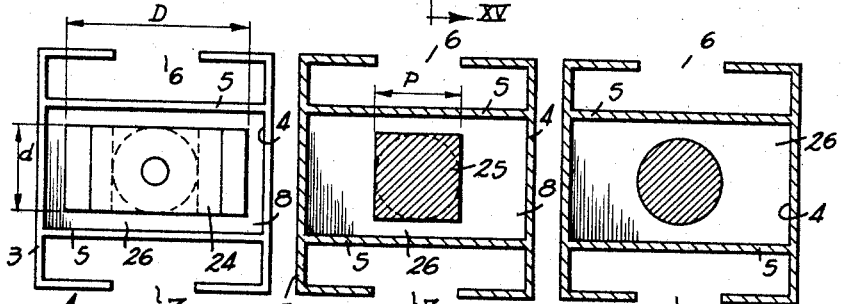
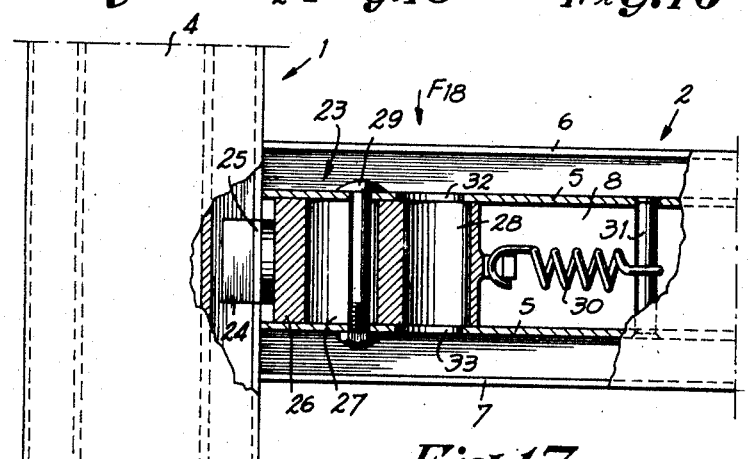

March 25, 1969  G. LEURENT  3,434,748
DEVICE FOR ASSEMBLY OF METALLIC SECTIONAL STRUCTURES
Filed Oct. 11, 1966  Sheet 6 of 6

INVENTOR.
G. Leurent
BY Richards & Geier
ATTORNEYS

United States Patent Office
3,434,748
Patented Mar. 25, 1969

3,434,748
DEVICE FOR ASSEMBLY OF METALLIC SECTIONAL STRUCTURES
Ghislain Leurent, Mouscron, Belgium, assignor to Societe Industrielle de Transformation des Plastiques, Societe Anonyme, Tourcoing, Nord, France
Filed Oct. 11, 1966, Ser. No. 585,861
Claims priority, application France, July 20, 1966, 70,092, 70,093
Int. Cl. F16b 9/02; E04g 7/00
U.S. Cl. 287—54    4 Claims

ABSTRACT OF THE DISCLOSURE

A device for the assembly of a crossmember and an upright member. The crossmember has a hollow core and an elongated transverse first passage and the upright member has a slot delimited by flanges. The device also includes a locking member having a body portion displaceably mounted in the core of the crossmember and having a transverse second passage and a head portion protruding from said crossmember, spring means continuously urging the locking member into said core, and means to limit this inward movement so that the first and second passages overlap one another, and a wedge-shaped tool adapted to be temporarily engaged in the partially overlapping passages so as to displace the locking member against the action of the spring means until the head protrudes a sufficient distance from the crossmember that it may be engaged in the upright through the slot thereof, after which the wedge-shaped tool may be rotated over 90° and then removed out of said passages so that said head is then firmly applied against said flanges by the spring means.

---

The present invention is concerned with the techniques of construction and erection of all sorts of walls, partitions or similar metallic structures of the type consisting of a combination of a resistant structure made up, on the one hand, of uprights and crosspieces, and on the other hand, of filling panels, completed by the traditional fixed frames and opening panels.

The invention also pertains to said resistant structures per se. Its object is the provision of novel means which make the erection, or respectively the dismantling operations of such metallic constructions considerably faster, more comfortable and less expensive.

Originally, such metallic structures were made by assembling uprights and crosspieces by means of bolts, screws, or similar accessory elements in considerable numbers.

It was later on suggested to provide the uprights with attaching means for the crosspieces. This arrangement was most definitely an improvement, but made it necessary to erect the entire tubular structure progressively in order to permit the attachment of the adjacent elements. On the other hand, this arrangement made no provision whatsoever for the rather frequent case where only part of such a wall or partition has to be modified, which requires the removal of one or more crosspieces and/or uprights.

The present invention pertains to certain novel means which provide for a great facility in erection, or in dismantling, of any crosspieces, in any location whatever of the metallic structure, by a simple and fast operation and without disturbing in the least the neighbouring crosspieces or uprights or any other part whatever of the metallic construction.

With this object in view, the device according to the present invention for the assembly of metallic sectional structures is characterized by the fact that said crossmembers are attached to said uprights by means of retractable locking devices.

These locking devices are provided, as far as shape and dimensions are concerned, in accordance with the sections used for the construction of the uprights of the resistant structure, in such manner, that when a crosspiece has been correctly placed and its locking device released, it can firmly engage the corresponding parts of the two adjacent uprights and correctly maintain their position, the stability of said crosspieces being on the other hand reinforced by the subsequent attachment of the filling panels.

These attachment elements can be made in any suitable shape or dimension. The operations required to bring them into their retracted position can be effected by any suitable means, just as their attachment to the corresponding parts of the adjacent uprights can be brought about in any suitable manner, generally by some energetic pressure application.

Merely as an example, and without any limitation, certain forms of embodiment are described hereafter with reference to the appended drawings in which.

Figure 1:
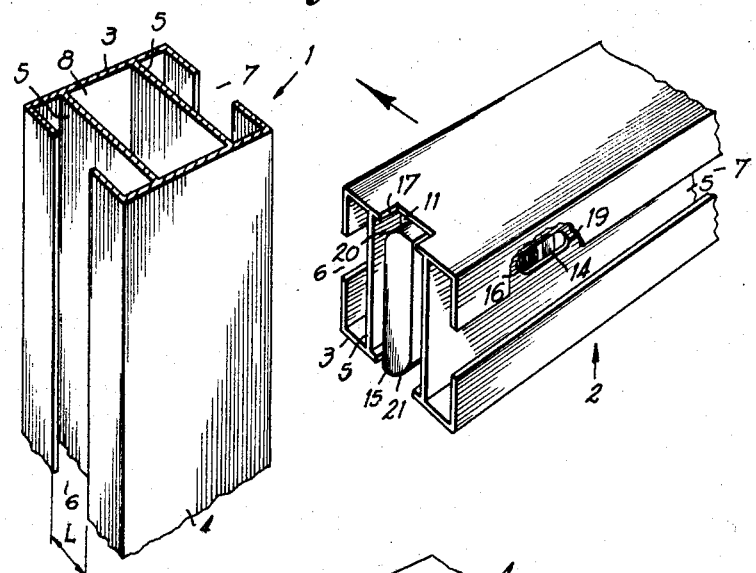
FIGURE 1 shows a perspective view of part of an upright and part of a crosspiece shaped in accordance with the present invention.
Figure 2:
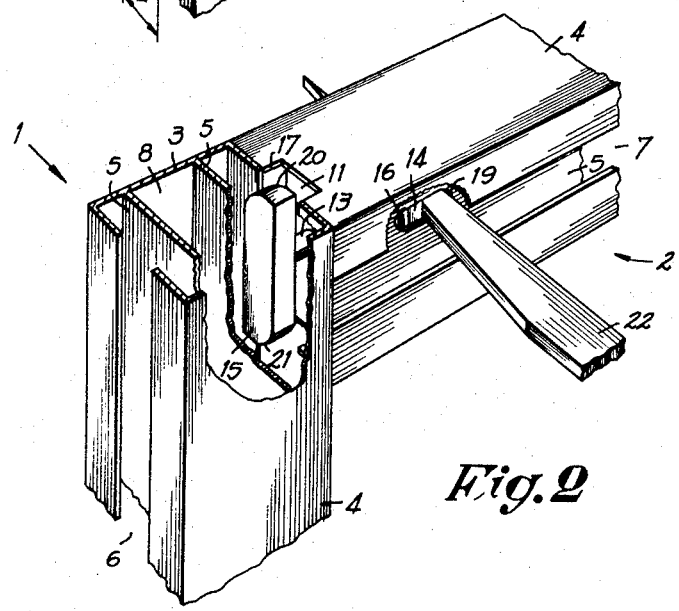
FIGURE 2 shows a characteristic phase of the erection of a structure according to the invention.
Figure 3:
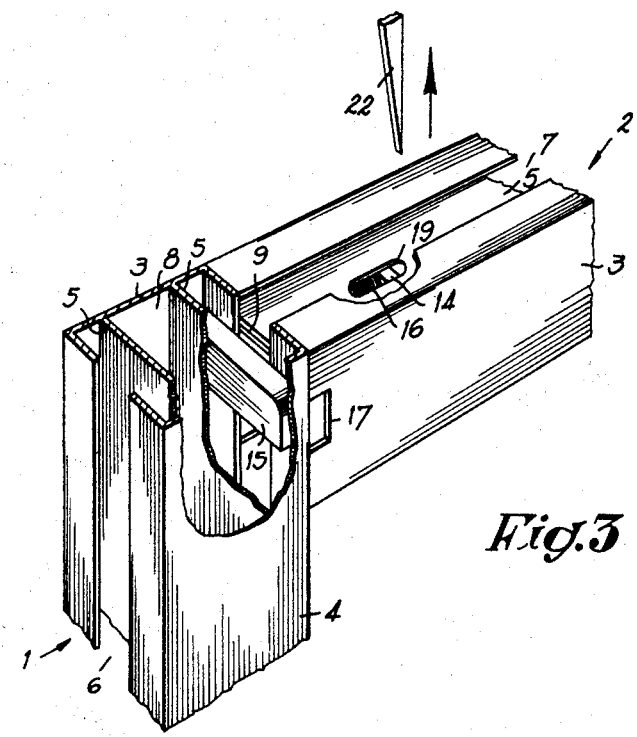
FIGURE 3 shows the final phase of this erection.
Figures 5, 6:
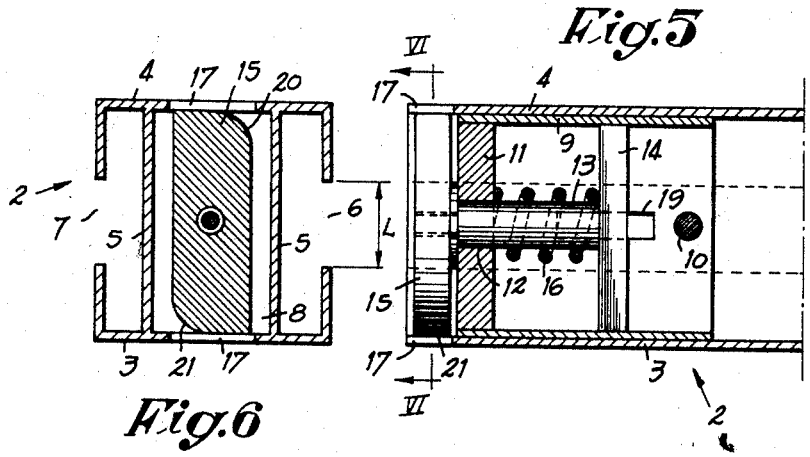
Figure 18:
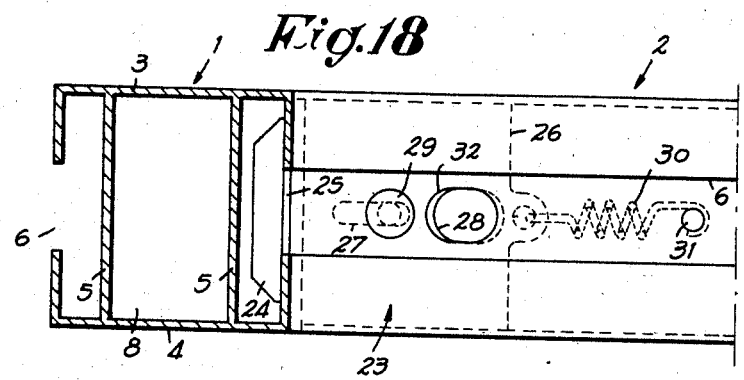

FIGURE 4 gives a schematic representation of the first phase of the attachment procedure of a crosspiece to the adjacent uprights;

FIGURE 5 shows a cross section according to line V—V of FIGURE 4;

FIGURE 6 shows a cross section according to line VI—VI of FIGURE 5;

FIGURE 7 is a view similar to that of FIGURE 4, showing the second phase of the assembly process of a crosspiece to the adjacent uprights;

FIGURE 8 shows a cross section according to line VIII—VIII of FIGURE 7;

FIGURE 9 is a view similar to that of FIGURE 4, showing a third phase of the assembly process of a cross piece to the adjacent uprights;

FIGURE 10 is a cross section according to line X—X of FIGURE 9;

FIGURE 11 schematically shows the final phase of the assembly process of a crosspiece to the adjacent uprights;

FIGURE 12 is a cross section according to line XII—XII of FIGURE 11;

FIGURE 13 shows a horizontal cross section of an upright and of part of a crosspiece using an alternative version of the assembly device according to the invention;

FIGURE 14 shows a cross section in the sense of the arrow on FIGURE 13;

FIGURES 15 and 16 show cross sections, respectively according to lines XV—XV and XVI—XVI of FIGURE 13;

FIGURE 17 shows a partially cut-away upright view of an assembly which makes use of the elments according to FIGURES 13 to 16;

FIGURES 18 to 21 show alternative forms of embodiment of the characteristic assembly according to the present invention.

In the form of embodiment according to FIGURES 1 to 16, the construction of the uprights 1 and of the crosspieces 2 of the resistant structure was chosen as a special section having a generally box-type shape with continuous front and back surfaces, respectively 3-4, a solid joint 5, two continuous side openings 6-7 of width "L" and, bounded in the present case by the solid joints 5, a closed box type core 8.

Crosspieces 2, taken for instance from identical sections as uprights 1, are fitted at each of their ends with a tubular element 9, which is for instance a tight fit in central part 8 and attached to the latter by a rear cross pin 10. Towards the front, this tubular element 9 is closed by a wall 11, provided with a circular hole 12. A rod 13, the rear end of which is fitted with a piston 14, passes through said hole and is provided at its front end and past wall 11 with a locking device 15. A relatively strong return spring 16 surrounds rod 13 and bears on the one hand against wall 11, and on the other hand against piston 14, so that locking device 15 is permanently stressed towards its retracted position, i.e., towards the interior of the crosspiece. In order to facilitate the return of the locking device to its retracted position, the crosspiece is provided at each end with a notch 17. Tubular lining 9 and the adjacent surface of central core 8 of crosspiece 2 are both provided, on two opposite and parallel sides, with elongated openings, respectively 18–19. These openings are located two by two opposite each other and are such, that when the mobile assembly 13–14–15 is in its retracted position, they extend beyond the rear face of piston 14. In this particular case, locking device 15 is of a general prismatic shape, of which two diagonally opposite edges are replaced by a wide radius, respectively 20–21. This locking device is such that it can slide into one of the side compartment of uprights 1.

Taking for granted that uprights 1 of the resistant structure are normally fitted and maintained in their definite position by generally known means, such as pressure screws, the rapid and easy fixing of a crosspiece is provided for by the successive phases schematically shown in FIGURES 4, 7, 9 and 11, the crosspiece 2 being such that its length H is equal to, or approximately equal to the distance which separates two adjacent uprights. During the first phase of the erection (FIGURE 4), the end on locking devices are retracted as shown in FIGURES 5 and 6. During the second phase (FIGURE 7), crosspiece 2 is presented in the exact location provided for between the two adjacent uprights, after which wedges 22 are fitted in elongated openings 18–19, thus solidly pressing locking elements 15 against the pressure of their return springs 16.

During this phase of the erection, as shown in FIGURE 8, the locking elements 15 have entered the side compartments of the adjacent sides of adjacent uprights 1. During the third phase (FIGURE 9), in order to ensure the attachment of the locking devices in the uprights, it is sufficient to rotate crossmember 2 through 90° about its longitudinal axis. For this purpose it is most convenient to use the protruding parts of the wedges 22. In this new position of crossmember 2, the locking device is exactly in the position shown more particularly in FIGURE 10.

Finally, the last phase of the process (FIGURE 11) consists of extracting wedges 22 so as to free springs 16 which will then strongly stress locking elements 15. The latter are as then firmly pressed against the adjacent parts of the flanges bordering side openings 6–7 of the uprights, thus solidly maintaining the crossmember in its correct position, as shown in FIGURE 12.

It is obvious that this position can easily and at any time be corrected or modified, since by the mere use of wedges 22 the locking devices can be partially or totally relieved from the stress of return springs 16.

It will be noted that the attachment of the crossmembers is almost instantaneous, since the uprights are firmly held in their correct position by any type of means generally well known. Similarly, in order to remove one or more crosspieces, it is sufficient to reverse the cycle of operations, by again fitting wedges 22 through superposed openings 18–19, so as to free the locking devices, rotating the crossmembers through 90° about their longitudinal axis and again removing the wedges, thus almost instantaneously returning the locking devices to their retracted position, which automatically liberates them from the adjacent uprights.

In this embodiment, the fixing of the crossmembers is provided for exclusively by the locking devices 15 themselves. In this embodiment, the fixing of the cross-member is only provided for in one sense, the crossmember remaining free to rotate around its axis in the opposite sense. It is quite easy to provide means for maintaining said crossmember in both senses. For this purpose, it will be sufficient, as shown in FIGURES 13 to 21, to correctly shape the part of the locking device which is adjacent to the back surface of the locking head proper, in such manner that it fits into the longitudinal openings of the uprights. It will be noted, that in the embodiment shown in FIGURES 13 to 18, where uprights 1 and crossmembers 2 of the same type as in the previous example are used, the assembling device mainly consists of a locking element 23 of slightly more complex shape. The latter is now made up of a fixing head 24, a locking section 25 and a guide shank 26. Head 24 has a width $d$ which is smaller, and a length D which is larger, than width L of the openings 6–7 in the uprights. The locking section 25 may for instance be of rectangular shape and have at least one transverse dimension P equal to, or slightly smaller than, said width L. In the embodiment described, this locking section has a square shape with side dimension P. Thickness E + $e$, respectively of the fixing head 24 and of the locking section 25, is less than depth T of the side hollows of upright 1 by a value which is greater than $e$. The guide shank is made so as to be able to slide in the central core 8 of crossmember 2.

Two elongated openings 27–28 are provided straight through said shank. A stop 29, consisting of a bolt or pin, passes through one of these and is anchored in two opposite walls of the central tubular core of cross-member 2, thus limiting the return movement of the locking element which is permanently stressed by return spring 30, hooked on the one hand unto the shank 26 of the locking element, and on the other hand unto a crosspiece 31, solidly attached to crossmember 2.

Return spring 30 may be replaced by a pressure spring, applied on the one hand against shank 26 of locking element 23, and on the other hand against fixed cross-piece 31. The fitting of the wedge will then cause the displacement of locking element 23 into its retracted position.

The second elongated opening 28 is located opposite holes 32–33 provided in the two opposite walls of the central core of crossmember 2. These holes are located in such manner with respect to the elongated opening 28, that by fitting a wedge, locking element 23 is caused to move to its extended position, thus further stretching return spring 30. The displacement of locking element 23 must be slightly greater than said thickness $e$.

In order to assemble a crossmember 2 to an upright 1, the crossmember should merely be correctly positioned between the two neighbouring uprights in such manner that fixing head 24 of the locking device is directed so that its smallest width $d$ is perpendicular to the longitudinal axis of openings 6–7 in said uprights.

Next, a wedge 22 may be fitted through openings 28–32–33, in order to press locking elements 23 into their extended position. The crossmember may now be rotated through 90° about its longitudinal axis, and wedges 22 be removed. Locking elements 23 are then instantaneously pulled back by their return spring 30 towards their retracted position. Consequently, heads 24, which are now placed transversally with respect to opening 6 or 7 of the uprights, act as fixed elements, while intermediate sections 25 ensure the locking of the crossmember in its correct position. The pulling stress of springs 30 between heads 24 of the locking devices and the adjacent flanges of continuous opening 6 or 7 which are in contact with these heads, is of a considerable value, and at any rate sufficient to maintain the crossmember at the correct level.

It is quite obvious that the same device can be applied to uprights and crossmembers having sections which differ from those described in the preceding example.

Figure 19:
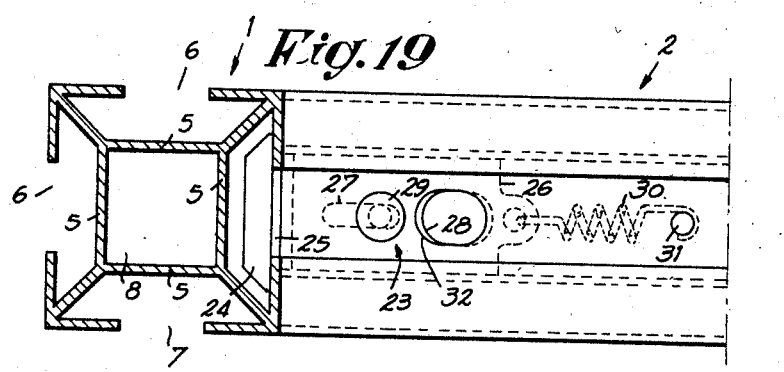
Figure 20:
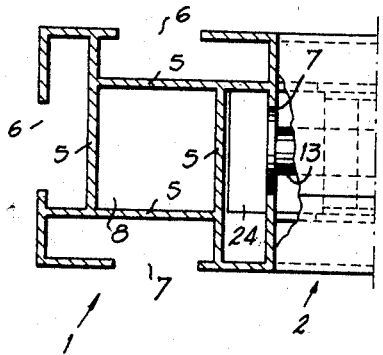
Figure 21:
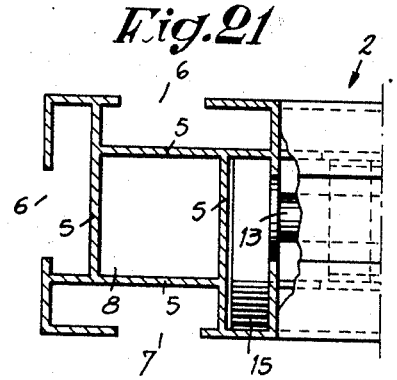

Alternative sections are shown in FIGURE 19, 20 and 21, the remainder of the characteristic locking devices, on the other hand, remaining unchanged.

It is also obvious, that the constituent parts of the locking device, respectively the head, the intermediate locking section and the shank, may vary widely as far as shape and dimensions are concerned, so as to be adapted to the shape and dimensions of the sections chosen for the uprights and the crossmembers.

If for certain applications an extra safety is required, nothing would prevent locking devices 15 to be provided with a dowel which can be engaged in an appropriate orifice of the central core of the uprights. Locking elements of any shape and dimension may be taken into consideration, the attaching and locking means acting by mutual engagement of any appropriate part of the locking device on the one hand, with any corresponding part of the sections forming the uprights on the other hand. It is also possible to take into consideration the coupling of both end locking devices of the same crossmember, for instance by means of cables, rods or chains, or of any other suitable means, in such a way that the two locking devices can be simultaneously acted upon to extend or retract by the operation of one single element.

The individual or combined control of the two locking devices of one and the same crossmember can be brought about by a straight line or rotary movement of any appropriate element. The appropriate stressing of the locking devices could eventually be ensured otherwise than by springs for instance by screws or other devices.

The present invention is concerned with the assembling device as such, essentially characterized by retractable locking devices, as well as with any special parts required for constructing this device and with all uprights, crossmembers or metallic structures incorporating one or more of the characteristics disclosed herein.

What I claim is:

1. A member device for the assembly of a crossmember and an upright member of a structure including at least one such crossmember and at least one such upright member, said crossmember having a hollow core and an elongated transverse first passage perpendicular to the longitudinal direction of said crossmember and said upright member having a slot delimited by flanges, said device also including a locking member having a body portion displaceably mounted in the core of said crossmember and having a transverse second passage parallel to said first passage and a head portion protruding from said crossmember, spring means continuously urging said locking member into said core, means to limit said inward movement so that said first and second passages partially overlap one another, and a wedge-shaped tool member adapted to be temporarily engaged in said partially overlapping passages so as to displace said locking member against the action of said spring means until said head protrudes a sufficient distance from said crossmember so that it may be engaged in said upright through said slot, after which said wedge-shaped tool may be rotated about 90° and then removed out of said passages so that said head is then firmly applied against said flanges by said spring means.

2. A device as described in claim 1 wherein said structure includes at least two uprights and one crossmember and wherein said wedge-shaped tool is common to both the locking devices used for assembling said crossmember to both said uprights.

3. A device as described in claim 1 wherein said locking member also has an intermediate locking section between said body portion and said head portion, said intermediate locking section having a prismatic shape with a polygonal base having at least one transverse dimension at most equal to the width of said slot wherein said head is located when said crossmember is secured to said upright.

4. A device as described in claim 3 wherein said body portion has a transverse third passage and wherein said motion limiting means include a bolt which extends through said third passage and is fixed to said crossmember.

References Cited

UNITED STATES PATENTS

| | | | |
|---|---|---|---|
| 1,420,589 | 6/1922 | Talbott | 287—20 |
| 2,415,825 | 2/1947 | Knuth | 211—183 |
| 3,061,055 | 10/1962 | Nijhuis | 189—364 |

FOREIGN PATENTS

| | | |
|---|---|---|
| 555,554 | 7/1932 | Germany. |
| 49,013 | 7/1934 | Denmark. |
| 1,435,227 | 3/1966 | France. |

CARL W. TOMLIN, Primary Examiner.

A. KUNDRAT, Assistant Examiner.

U.S. Cl. X.R.

287—56